Patented June 26, 1934

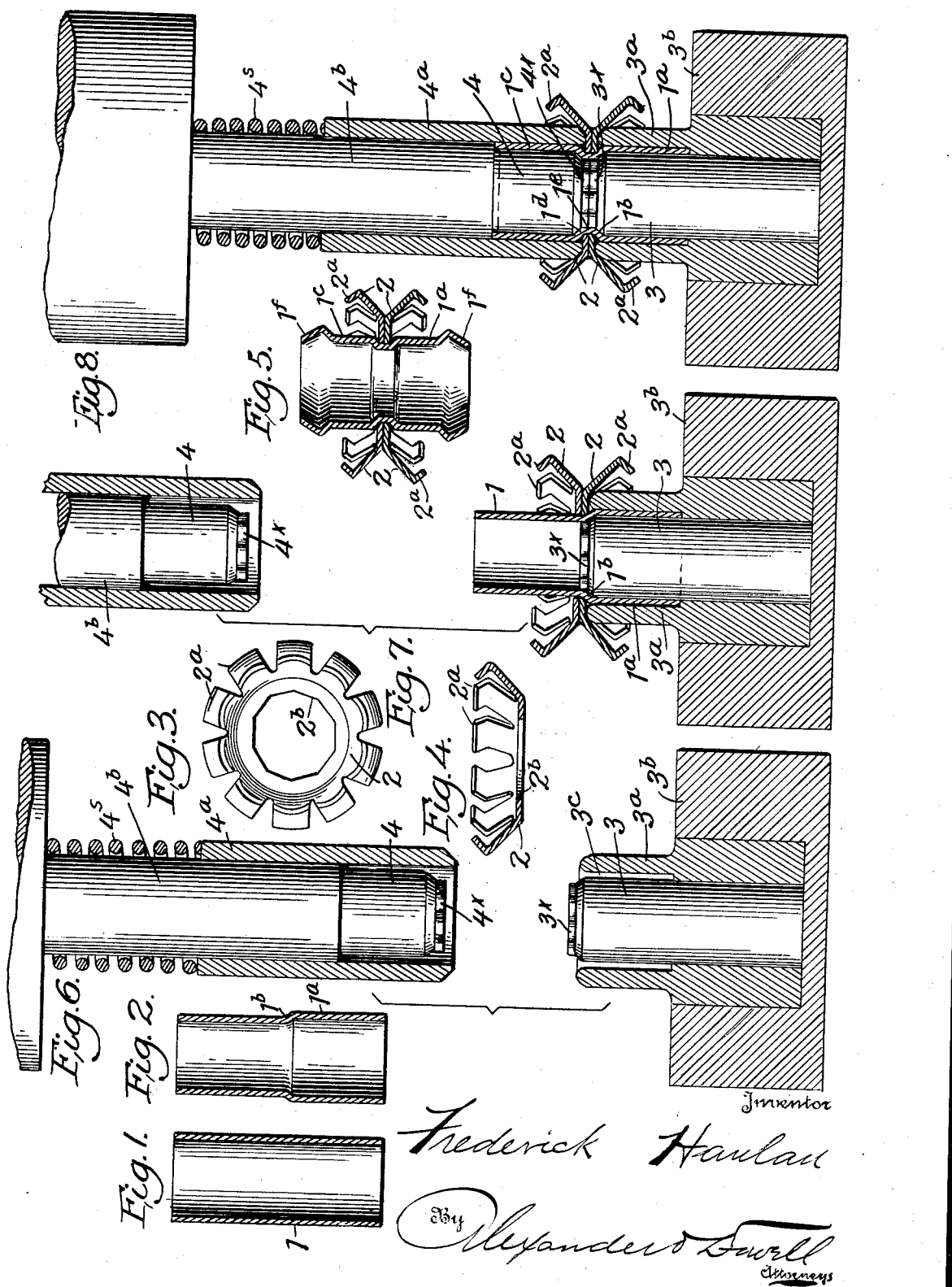

1,964,630

UNITED STATES PATENT OFFICE 1,964,630

METHOD OF AND APPARATUS FOR MAKING HOSE MENDERS AND COUPLINGS

Frederick Hanlan, Battle Creek, Mich., assignor to H. B. Sherman Manufacturing Company, Battle Creek, Mich., a corporation of Michigan Application November 9, 1933, Serial No. 697,338

6 Claims. (Cl. 153—2)

This invention is a novel method of and apparatus for making hose menders and couplings for connecting sections of rubber hose or the like in a simple, quick and efficient manner.

Such menders ordinarily comprise a tubular portion whose ends are adapted to be entered into the ends of adjacent hose sections, and deformable clamping members mounted on such tubular portion and adapted to be bent down upon the ends of the hose sections, after the tubular portion has been inserted therein, to firmly bind the hose sections in place; thus completing the connection.

I will explain the invention with reference to the accompanying drawing which illustrates my novel method of and apparatus for manufacturing such menders; and set forth in the claims the invention for which protection is desired.

In said drawing:

Fig. 1 is a view of the tubular member of the hose mender before expansion thereof.

Fig. 2 is a view of such member after the initial expansion of one end thereof.

Figs. 3 and 4 are plan and sectional views of one of the spider clamp members.

Fig. 5 is a view of the complete hose mender.

Fig. 6 is a view of the die and punch used in assembling and connecting the tubular member and clamp members.

Fig. 7 is a view similar to 6 showing the tubular member and clamp members assembled on the die previous to the second expanding operation on the tubular member.

Fig. 8 is a view showing the completion of the operation whereby the clamp members are permanently positioned on the tubular member.

In carrying out my invention I take a tube 1 (Fig. 1) whose diameter is slightly less than the final diameter for the tubular portion of the hose mender, and expand one end of the tube as indicated at 1a in Fig. 2, leaving an annular shoulder 1b at the junction of the expanded and non-expanded portions of the tube. The expanded end portion 1a of the tube is then slipped over a die 3 secured on a suitable base 3b and the upper end of the die 3 being shaped to exactly conform to fit the interior of the expanded part 1a of the tube and the shoulder 1b thereof (see Fig. 6). The die 3 is surrounded by an exterior member 3a on the base, an annular recess 3c being formed between the die 3 and the holder 3a accurately conforming to the expanded portion 1a of the tube 1.

After the tube is thus positioned two oppositely facing clamp members 2 are slipped upon the unexpanded portion of the tube and rest upon the shoulder 1b thereof as shown in Fig. 7. These clamp members may be of the usual type, and are preferably stamped out of sheet metal in the form of flat disks with projecting clamping fingers 2a. The clamp members have ordinarily been provided with hubs, but I prefer not to form them with hubs, so that the disk-like clamp members can closely abut each other, as indicated in the drawing.

After the clamp members are in position on the tube (as indicated in Fig. 7) the upper end of the tube is expanded as at 1c to the same diameter as the portion 1a. The upper end of the tube is preferably expanded by means of a die 4 corresponding to the die 3, mounted on a rod 4b which is surrounded by a sleeve 4a slidably mounted on the rod but normally projected slightly below the lower end of the die 4 by means of a spring 4s (see Figs. 6–8). The sleeve 4a is slightly larger in diameter than the die 4, and as the die 4 enters and expands the upper end of the tube 1 the sleeve 4a prevents twisting and distortion of the tube until the inner end of the die 4 nearly contacts with the upper end of the die 3 (see Fig. 8) and forms a second shoulder 1d in the tube just above clamp members 2. The upper expanded end 1c of the tube is similar to the expanded end 1a of the tube.

The disk portions of the clamp members are thus closely pressed together and confined between the shoulders 1b, 1d, which practically leave an annular unexpanded portion 1e at the center of the tube, which forms an annular groove on the exterior of the expanded tube in which annular groove the inner edges of the disks 2b are closely fitted, and the disks are thus inseparably secured on the tube.

After the clamp members have been secured to the tube as above described the ends of the tube may be rolled into conical shape as shown at 1f in Fig. 5. The shaping of the ends 1f can be done by any suitable means and it is unnecessary to illustrate same.

Preferably the openings in the clamp members are polygonal instead of exactly circular as indicated in Fig. 3, and the dies 3 and 4 have small projections 3x and 4x respectively at their ends the shape of such polygonal openings, and as the dies reach their innermost portions the projections 3x, 4x cause the metal of the tube to bind in the corners of the polygonal openings in the clamp members to prevent rotation of the latter on the tube.

As there are preferably no hubs on the clamp members when the hose ends are slipped on the tube before the fingers are hammered down they are sure to go clear in against the flat surfaces of the clinching members whereas in hose menders which have hubs on the clamp members the hose ends may be impeded and not go clear in and in any case do not reach the flat surfaces of the disks because the hub makes the aperture where the ends of the hose rest become narrower at the bottom, and the hose cannot go in so far.

Fig. 8 shows the completion of the operation; punch 4 having expanded the upper portion 1c of tube 1 to equal the lower portion 1a of said tube in diameter, both internally and externally and completed the assembly of the clamp members and tube entirely by internal expansion. While I have specifically described and illustrated the invention as employed in manufacturing hose menders, hose couplings with clamp members may be manufactured in a similar manner. In making such coupling the tubular portion of the female member would have a shoulder as 1b formed thereon, then a single clamp member 2b would be placed on the tube and then the tube expanded to secure such clamp member in position as above described. The male member of the coupling would have a tubular portion or shoulder 1b formed thereon, then a single clamp member would be placed on the tube and secured thereto by expanding the tube as described. The shape of the dies are such that the internal diameter of the tube at the point where the clamp member or members are located has not been disturbed by the operation. In loading the die, as in Fig. 7 the clamp members are located on the tube by dropping them down at rest against the shoulder 1b and then by expanding the upper part of the tube this shoulder is left as an internally projecting rib of a shape conforming to the original opening in spider. In attaching the clamp members no pressure from without is employed to reduce the diameter of the tube but, on the contrary, the tube is expanded from each end to accomplish the fastening of the clamp member or members to the tube. The clamp members preferably have no hub and no lip, and are not pressed inwardly on the tube, but the tube is expanded outwardly except for the portion directly within the clamp members.

I claim:—

1. Method of making hose menders and/or couplings of the character specified; consisting in expanding one end of a tube to form a shoulder at the inner end of the expanded portion, placing on the unexpanded portion of the tube a clamp member having an opening of less diameter than said expanded portion and abutting the shoulder, and then expanding the unexpanded end of the tube to form another shoulder at the inner end of said second expanded portion thereby binding the clamp member in place between said shoulders.

2. Method of making hose menders of the character specified; consisting in expanding one end of a tube to form a shoulder adjacent the central portion thereof, placing on the unexpanded portion of the tube a clamp member having an opening of less diameter than said expanded portion and abutting the shoulder, then expanding the unexpanded end of the tube to correspond with the previously expanded portion to form a second shoulder at its inner end, thereby binding the clamp member in place between said shoulders.

3. The method of making hose menders of the character specified; consisting in expanding one end of a tube to form a shoulder adjacent the central portion thereof, placing on the unexpanded portion of the tube oppositely facing clamp members each having an opening corresponding in diameter to said unexpanded portion, said clamp members abutting the shoulder, and then expanding the unexpanded end of the tube to correspond with the previously expanded portion and form a second shoulder at its inner end, thereby binding the clamp members in place between said shoulders.

4. Apparatus for making hose menders, comprising a die for supporting the expanded end of a tube having a clamp member assembled thereon at the inner end of the expanded portion; a second die for expanding the other end of the tube while the tube is in position upon the first die member to bind the clamp member on the tube; and a sleeve slidably and yieldably surrounding the second die and adapted to prevent distortion of the portion of the tube being expanded by said die.

5. Method of making hose menders of the character specified; consisting in expanding one end of a tube to form a shoulder adjacent the central portion thereof, placing on the unexpanded portion of the tube a clamp member having a polygonally sided opening of less diameter than said expanded portion and abutting the shoulder, then expanding the unexpanded end of the tube to correspond with the previously expanded portion and form a shoulder at its inner end and bind the clamp member in place between said shoulders and force metal into the corners of the polygonal opening to prevent rotation of the clamp member.

6. Apparatus for making hose menders, comprising a die for supporting the expanded end of a tube having a clamp member assembled thereon, said member having a polygonally sided opening and abutting the shoulder at the inner end of the expanded portion; and a second die for expanding the other end of the tube while the tube is in position upon the first die to bind the clamp members in position, one of the dies having a polygonal inner end adapted to expand the metal of the tube into the corners of the polygonal opening in the clamp member to prevent rotation of said member on the tube.

FREDERICK HANLAN.